(12) United States Patent
Bigge et al.

(10) Patent No.: US 8,215,231 B2
(45) Date of Patent: Jul. 10, 2012

(54) HOUSEHOLD FOOD PROCESSOR WITH FOOD PROCESSING TOOLS

(75) Inventors: William J. Bigge, Newnan, GA (US); Michael P. Conti, Saint Joseph, MI (US); David J. Gushwa, Mishawaka, IN (US); Arren J. McCormick, Benton Harbor, MI (US); Ben C. Shao, Stevensville, MI (US); Jeffrey A. Wessel, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 435 days.

(21) Appl. No.: 12/477,976

(22) Filed: Jun. 4, 2009

(65) Prior Publication Data

US 2009/0301319 A1    Dec. 10, 2009

Related U.S. Application Data

(60) Provisional application No. 61/059,279, filed on Jun. 6, 2008.

(51) Int. Cl.
*A47J 43/14*   (2006.01)
*B26D 7/00*    (2006.01)

(52) U.S. Cl. ............... 99/509; 99/510; 99/537; 30/114; 30/279.2; 30/303; 30/304; 83/356.3; 83/932; 241/92; 241/100; 241/273.1; 241/282.1; 241/291

(58) Field of Classification Search .............. 99/537, 99/510, 509, 349, 353; 241/100, 273.1, 291, 241/92, 95, 282.1; 30/114, 117, 279.2, 303, 30/304; 83/167, 932, 356.2, 356.3; 100/243, 100/234
See application file for complete search history.

(56) References Cited

U.S. PATENT DOCUMENTS

| | | | | |
|---|---|---|---|---|
| 2,563,237 | A * | 8/1951 | Grocoff | 83/651.1 |
| 3,327,621 | A * | 6/1967 | Zysset | 100/125 |
| 3,664,396 | A * | 5/1972 | Tremblay | 425/152 |
| 3,783,727 | A * | 1/1974 | Brignard et al. | 83/592 |
| 4,095,339 | A * | 6/1978 | Turner | 30/114 |
| 5,303,640 | A * | 4/1994 | Gaber et al. | 99/495 |
| 5,478,018 | A * | 12/1995 | Wang | 241/100 |
| 5,692,424 | A * | 12/1997 | Wallace | 83/167 |
| D421,363 | S | 3/2000 | Crescenzi et al. | |
| 2002/0112583 | A1 | 8/2002 | Wong | |
| 2004/0060414 | A1* | 4/2004 | Sundqvist | 83/663 |
| 2004/0118259 | A1* | 6/2004 | Urschel et al. | 83/109 |
| 2007/0095189 | A1* | 5/2007 | Williams | 83/651.1 |
| 2007/0252024 | A1 | 11/2007 | Barraclough | |
| 2008/0271614 | A1 | 11/2008 | Chan | |

FOREIGN PATENT DOCUMENTS

| | | |
|---|---|---|
| GB | 132809 A | 12/1920 |
| GB | 658717 A | 10/1951 |
| GB | 2230428 A | 10/1990 |

* cited by examiner

*Primary Examiner* — Reginald L Alexander
(74) *Attorney, Agent, or Firm* — Kirk W. Goodwin; McGarry Bair, PC (57) ABSTRACT

A food processor having a food processing path accessible through a slot in which is received at least one food processing tool removably received within the slot such that food passing along the food processing path is processed by the tool.

17 Claims, 7 Drawing Sheets

HOUSEHOLD FOOD PROCESSOR WITH FOOD PROCESSING TOOLS

CROSS-REFERENCE TO RELATED APPLICATION

This application claims the benefit of U.S. Provisional Application Ser. No. 61/059,279, entitled "Household Food Processor With Stacked Food Processing Tools" filed Jun. 6, 2008, which is incorporated herein in its entirety.

BACKGROUND OF THE INVENTION

Household food processors are used to prepare food items by conducting a processing operation, such as slicing, grating, or shredding, on the food item. Contemporary food processors conduct the processing operations one at a time because each processing operation is conducted by a different tool and the tool must be replaced between each processing operation.

SUMMARY OF THE INVENTION

In one aspect, the invention relates to a food processor comprising a housing defining a food processing path, at least one slot formed in the housing and extending into the food processing path, and at least one food processing tool removably received within the slot such that food passing along the food processing path is processed by the tool. In another aspect, the food processor also includes a drive system and a food pusher moveable within the food path to push food along the path. A plurality of food processing cassettes are sized for receipt within the food processing slot, with each cassette having a food processing tool applying a food processing function such that food passing along the food processing path is processed by the tool.

DESCRIPTION OF THE EMBODIMENTS OF THE INVENTION

Figure 1:
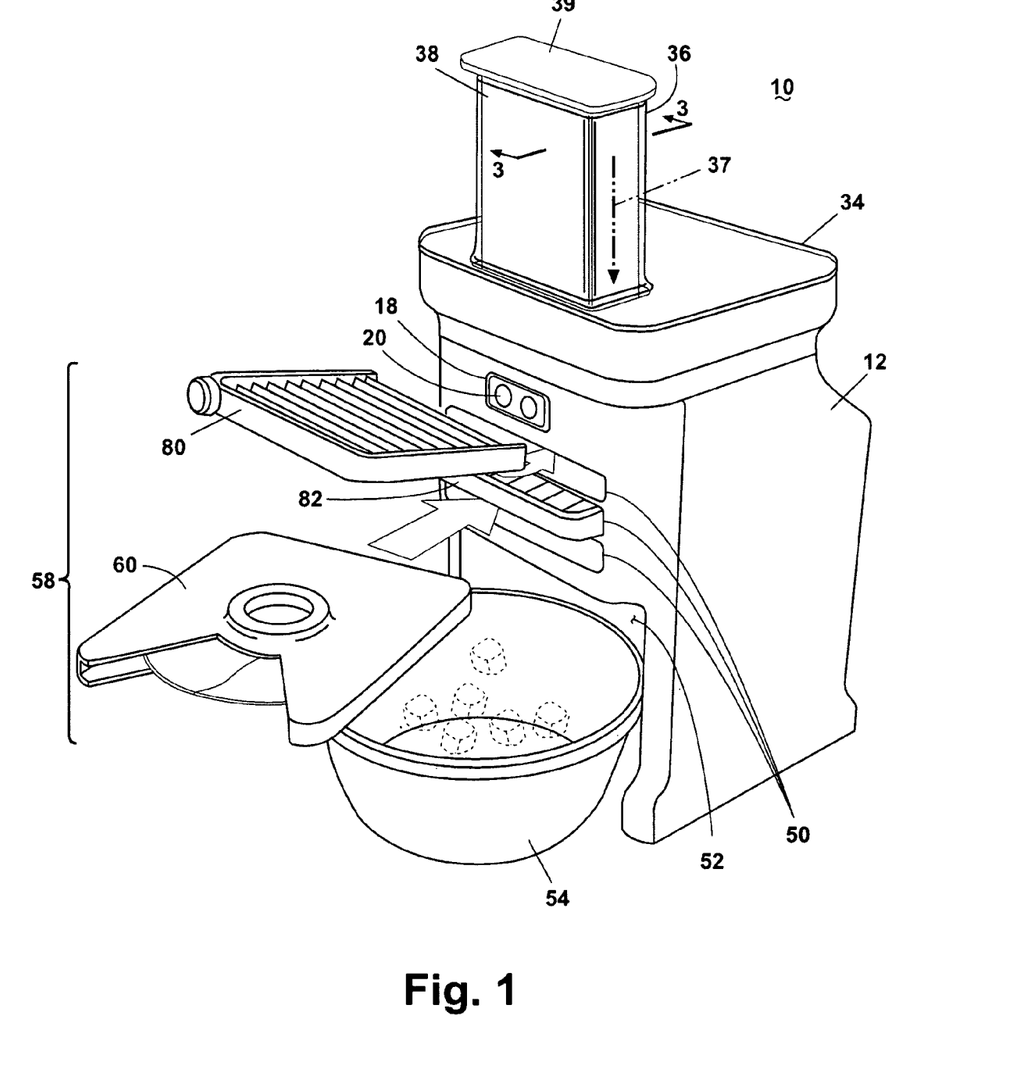
FIG. 1 a perspective view of a food processor according to a first embodiment of the invention.

FIG. 1 illustrates one embodiment of a food processor 10 according to the invention. The food processor 10 described herein shares some features of a traditional food processor, and will not be described in detail except as necessary for a complete understanding of the invention.

The food processor 10 may be illustrated comprising a housing 12, which may include a user interface 18 that has operator controls 20, such as a dial(s) and/or switch(es), to enable a user to control the operation of the food processor 10. The top of the main housing 12 is closed by a housing cover 34, which may be removably secured to the main housing 12 by a snap fit, a twist lock arrangement, or any other suitable means of attachment. The housing cover 34 is illustrated as being transparent, but need not be.

The housing cover 34 includes a feed tube 36, which is formed into and extends upwardly from the housing cover 34. The feed tube 36 forms an inlet to a food processing path 37 extending through the housing 12.

A food pusher 38 is provided to push food down the feed tube 36. A stop, in the form of flange 39, is provided on the food pusher 38 to limit the insertion of the food pusher 38 into the feed tube 36.

One or more food processing tools, generically referred to by numeral 60, are received within corresponding slots 50 provided in the face of the housing 12 to place the food processing tool within the food processing path 37 where the food processing tools 58 may aid in processing food. With this configuration, the food processing tools 58 may be selectively inserted and removed from the slots 50 to provide the user with the ability to control and combine their functionality to obtain the desired food processing in a single pass of the food through the food processing path 37.

The housing 12 may also include one or more openings, which are illustrated as slots 50. In the illustrated embodiment, three slots 50 are shown, however, more or fewer slots may be provided. The slot 50 provides an opening in which to insert a food processing tool 58. Further, the slot 50 can be sized to receive at least one or a multiplicity of food processing tools 58 in a single slot 50.

The housing 12 further includes a recess 52 in the lower portion of the housing 12, which is in alignment with the food processing path 37. The user may place a bowl 54 in the recess 52 to collect the processed food. The bowl 54 is not integral to the food processor 10 and may be of any size and shape which fits within the recess 52.

Figure 2:
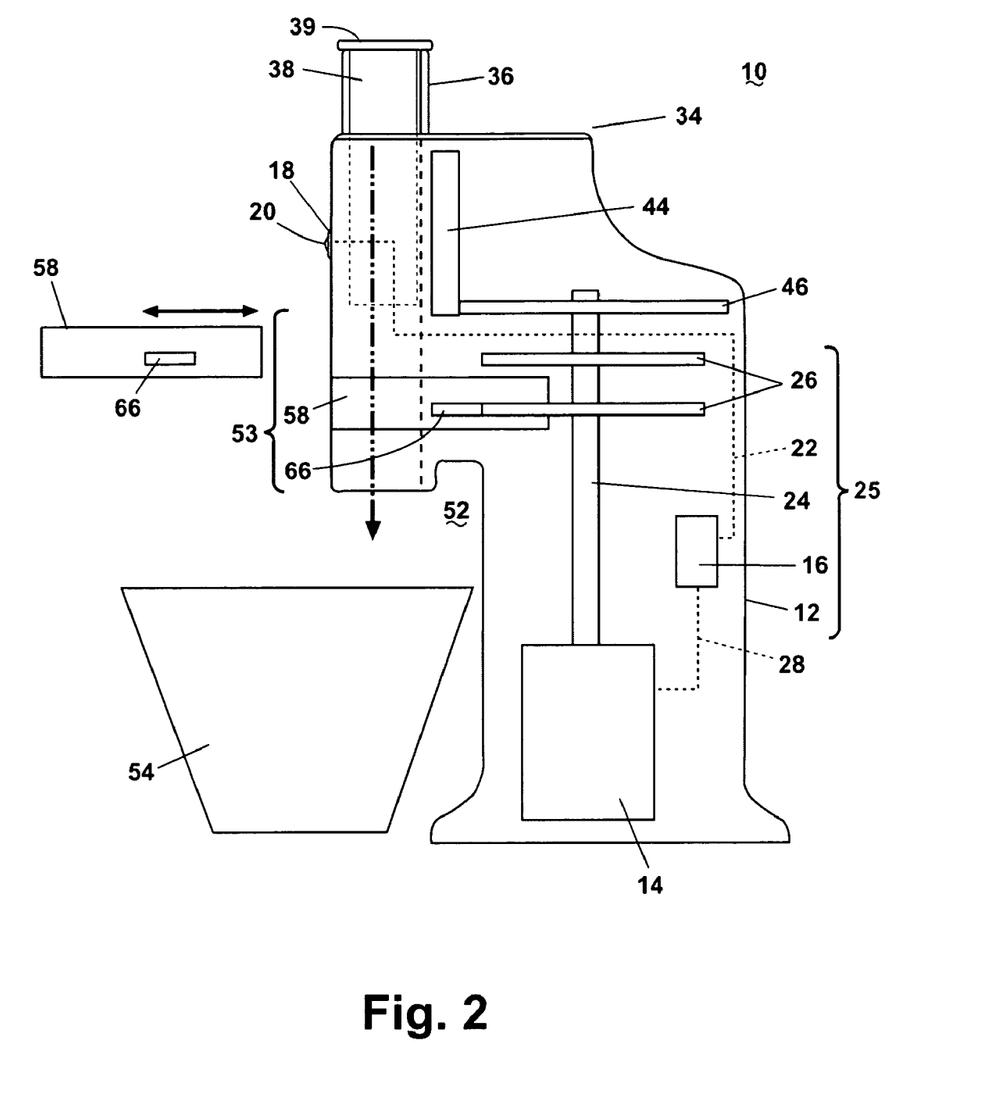
FIG. 2 is a schematic view of the food processor of FIG. 1.

Referring to FIG. 2, the entire food processing path 37 may be seen. As illustrated, the food processing path 37 has a housing portion 53 that extends between the feed tube 36 to the recess 52. The slots 50 intersect with the food processing path 37 such that the food processing tools 58 extend into the food processing path 37.

The food processor 10 further comprises a drive system operably coupled to the food processing tools 58 to drive the tools as needed to process the food. The drive system as illustrated comprises a motor 14 and a gear system 25. The gear system is operably coupled to the motor 14 and engages the food processing tools 58 when they are received within the slots 50.

An exemplary gear system 25 comprises a drive shaft 24 extending out of the motor 14 and an output gear 26 mounted to the drive shaft 24. As illustrated, there is an output gear 26 for each of the slots 50, which provides for driving any food processing tool 58 inserted into the corresponding slot 50. The drive shaft 24 and output gear 26 may be of any known gearing system, for example a planetary gear system, spur gear system, or any other suitable gearing system. For example, the output gears 26 may comprise one or more gears to effect a different gear reduction, which is useful when the different food processing tools 58 must be driven at different rates.

The food processor 10 comprises a control system operably coupled to the motor 14 to enable actuation of the motor 14. The control system as illustrated comprises a controller 16, which is electrically coupled through a user interface lead 22 to the operator controls 20. The motor 14 may be electrically coupled through lead 28 to the controller 16, or may be wirelessly coupled.

In operation, the user may selectively insert the food processing tools 58 into the slots 50 and place the bowl 54 in the recess 52. The food to be processed is placed in the feed tube 36 and the food pusher 38 is inserted into the feed tube 36. Power to the food processor 10 is turned on via the operator controls 20, which actuates the motor 14. The motor 14 drives the gear system 25, which, in turn, drives the food processing tools 58 to process the food.

The food is pushed by the food pusher 38 down the food processing path 37. As the food progresses down the food processing path 37, it passes through the installed food processing tools 58, which process the food according to the functionality of the specific food processing tool 58, which may, for illustrative purposes, include slicing, shredding, cubing or other. After the food passes through the installed food processing tools 58, the processed food falls into the bowl 54 to be collected.

Having multiple food processing tools 58 located within the food path 37 provides for sequentially applying the functionality from multiple food processing tools 58 in a single pass of the food. This structure provides flexibility and functionality that has not previously been obtainable by food processors. The user may mix and match the different food processing tools 58 to obtain processing functionality that was previously not possible.

Figure 3:
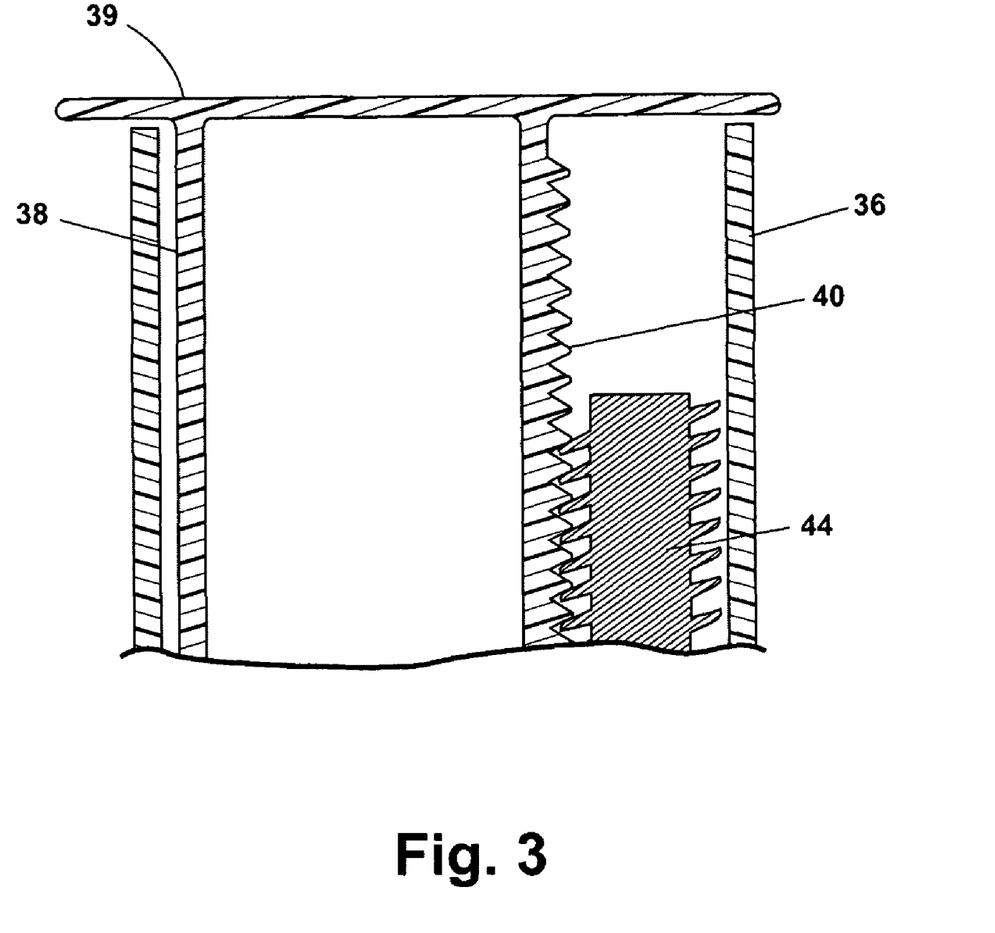
FIG. 3 is a cross-sectional view through the feed tube of the food processor illustrated in FIG. 1, according to one embodiment of the invention.

Referring to FIG. 3, according to one embodiment of the present invention, the food pusher 38 may also be designed to provide automatic functionality to push the food down the food processing path 37, instead of relying on the user to manually push the food pusher 38. FIG. 3 illustrates an exemplary means of providing automatic functionality of the food pusher 38 is through utilization of the gear system 25. A gear track 40 may be located on the exterior of the food pusher 38. The teeth on the food pusher 38 gear track 40 mesh with a screw drive 44 that extends up into the feed tube 36. The screw drive 44 is driven by an output gear 46 that is engaged with the main drive shaft 24. The screw drive 44 meshes with both the output gear 46 and the gear track 40, and the rotation of the screw drive 44 is translated into linear motion of the gear track 40, pulling the food pusher 38 down. Alternatively, the screw drive 44 may be driven by a secondary motor (not shown). As another alternative, the food pusher 38 may be manually operated by disabling the screw drive 44.

FIGS. 4-8 illustrate exemplary food processing tools that may be used for the previously identified food processing tools 58. As illustrated, the exemplary food processing tools comprise a plurality of cassettes for performing various food processing tasks, such as slicing, shredding, cubing, and forming "sticks". These cassettes can be inserted into the provided slots 50 as desired by the user.

Figure 4:
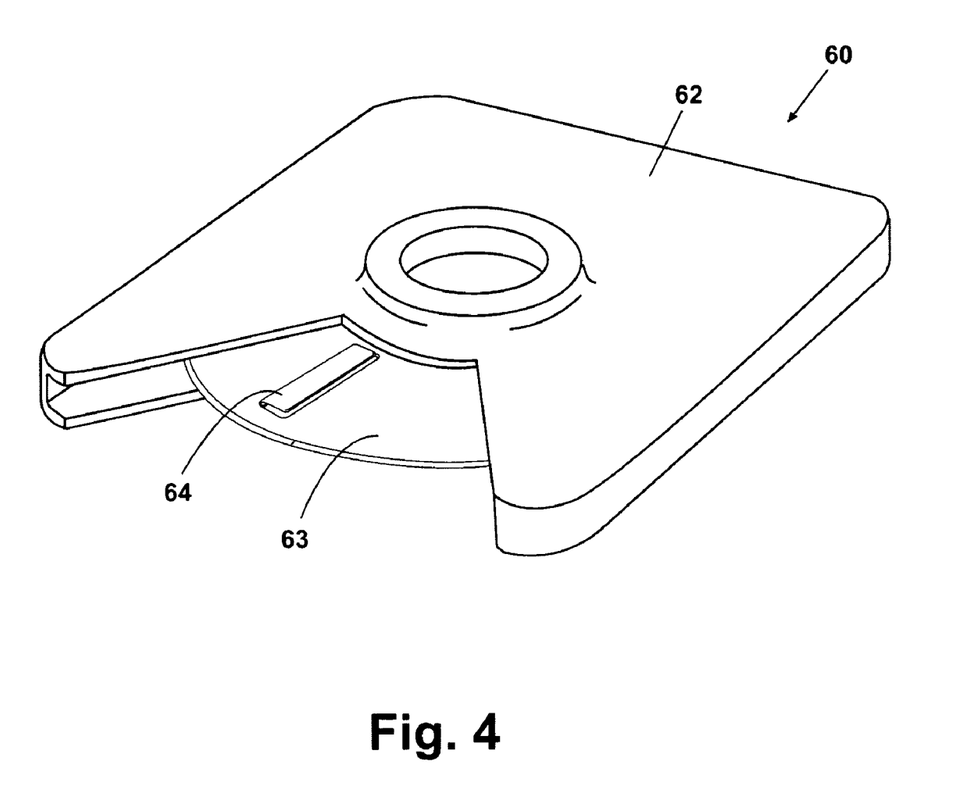
FIG. 4 is a perspective view of a slicing cassette according to one embodiment of the invention.

Referring to FIG. 4, the first exemplary food processing tool 58 is a slicing cassette 60, which slices the food to be processed. As illustrated, the slicing cassette 60 comprises a housing 62 that encloses a rotating slicing disc 63, which includes a slicing blade 64 and a cassette gear 66 (shown in FIG. 2). The housing 62 has a cutaway that exposes only a portion of the slicing disc 63, limiting the slicing blade 64 to slicing the food when the slicing blade 64 passes by the cutaway. The gear 66 (not shown) may be attached by any suitable means to the slicing disc 63 and is axially located at the center of the slicing disc 63, within the housing 62. As shown in FIG. 2, when the slicing cassette 60 is inserted into the provided slot 50, the cassette gear 66 meshes with the output gear 26. Therefore, the motor 14 drives the rotation of the slicing disc 63 and slicing blade 64 via the drive shaft 24, output gear 26, and cassette gear 66. The torque and speed of the slicing disc 63 can be controlled via the motor 14 and/or the gearing ratios.

Figure 5:
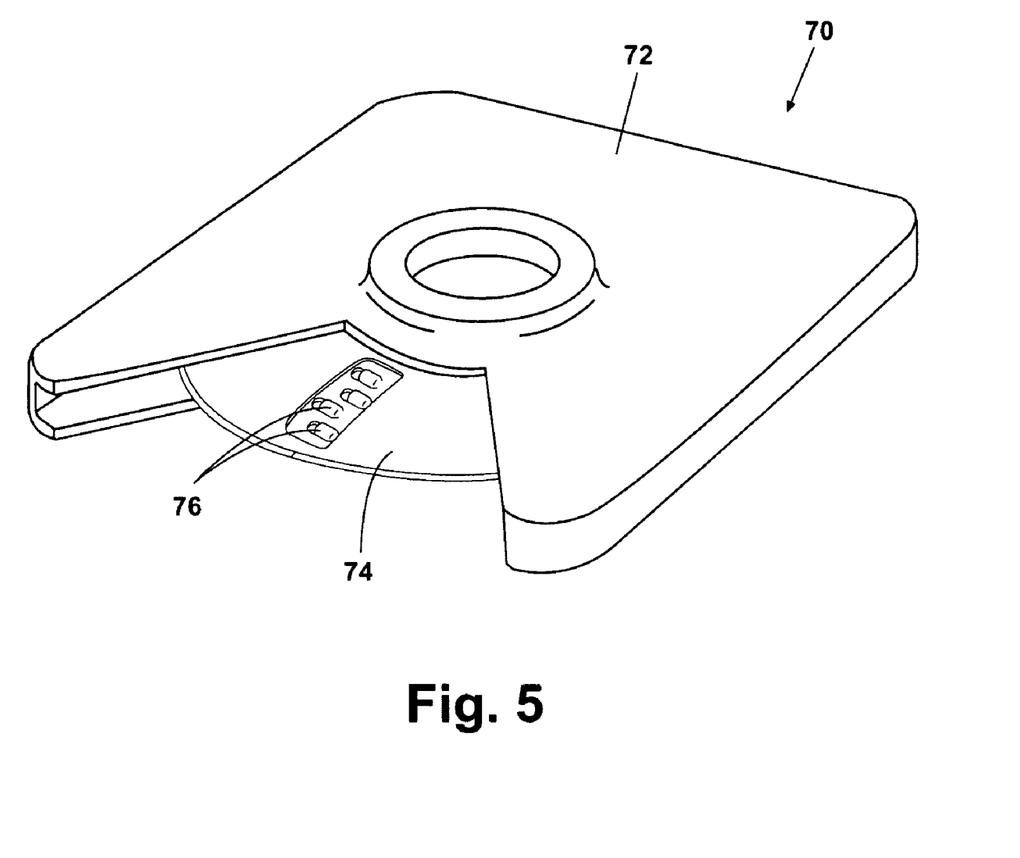
FIG. 5 is a perspective view of a shredding cassette according to one embodiment of the invention.

Referring to FIG. 5, the second exemplary food processing tool is a shredding cassette 70, which shreds the food to be processed. Like the slicing cassette 60, the shredding cassette 70 consists of a housing 72 that encloses a rotating shredding disc 74 that includes a cassette gear 66 (not shown) and at least one shredding port 76, or as illustrated, a plurality of shredding ports 76. The housing 72 has a cutaway that exposes only a portion of the shredding disc 74, limiting the shredding ports 76 to shredding the food when the shredding ports 76 pass by the cutaway. The gear 66 (not shown) may be attached by any suitable means, to the shredding disc 74 and is axially located at the center of the shredding disc 74, within the housing 72. As shown in FIG. 2, when the shredding cassette 70 is inserted into the provided slot 50, the cassette gear 66 meshes with the output gear 26. Therefore, the motor 14 drives the rotation of the shredding disc 74 and shredding ports 76 via the drive shaft 24, output gear 26, and cassette gear 66. The torque and speed of the shredding disc 74 can be controlled via the motor 14 and/or the gearing ratios.

Figure 6:
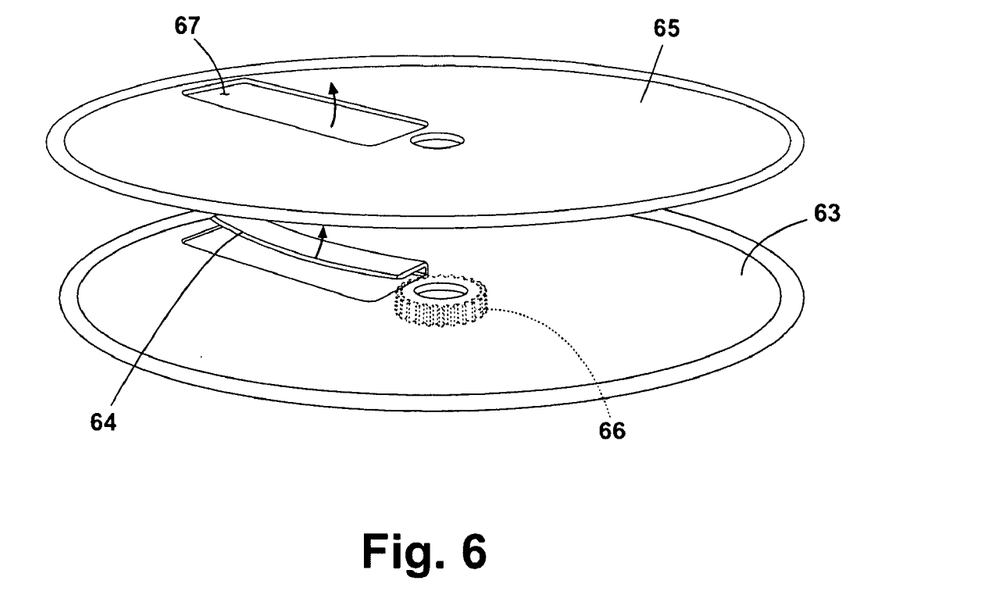
FIG. 6 is a partial exploded view of an adjustable slicing cassette according to one embodiment of the invention, with the outer housing removed.
Figure 7:
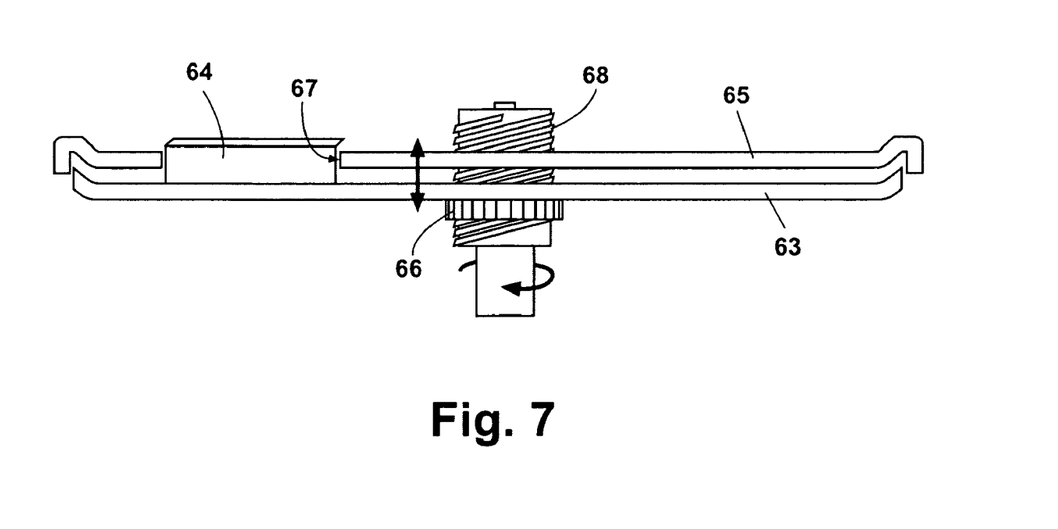
FIG. 7 is a partial side view of the adjustable slicing cassette of FIG. 6, with the out housing removed.

Referring to FIGS. 6 and 7, in another embodiment of the invention, the thickness of the sliced or shredded food can be varied, wherein the thickness is a function of the relative spacing between the discs and is described herein as the bite of the cutting element. This embodiment can be utilized on both the slicing cassette 60 and the shredding cassette 70, but will be described and illustrated herein with reference to the slicing cassette 60, with the housing 72 removed for clarity. One exemplary means in which the thickness of the sliced food can be varied may be accomplished by adding a food support disc 65 on top of the slicing disc 63. When the food support disc 65 and slicing disc 63 are coupled together, the slicing blade 64 may protrude through a cutout 67 in the food support disc 65. The thickness of the slice may be varied by adjusting the position of the slicing disc 63 with respect to the surface of the food support disc 65. The vertical position of the slicing disc 63 may be adjusted by means of a screw system which raises and lowers the slicing disc 63. The screw system may include a simple threaded shaft 68, along which the threaded slicing disc 63 may be translated up or down. However, other methods of adjusting the slicing disc 63 relative to the food support disc 65 are possible, for example, an automatic adjustment. To obtain a thicker slice of food, the slicing disc 63 may be adjusted to increase the space between the slicing blade 64 and the surface of the food support disc 65. Oppositely, to obtain a thinner slice of food, the slicing blade 64 may be adjusted closer to the surface of the food support disc 65. Examples of foods the user may make using the slicing cassette 60 include potato slices or orange slices. As mentioned above, the size of the shred may be adjusted within the shredding cassette 70 in a similar fashion.

Figure 8A:
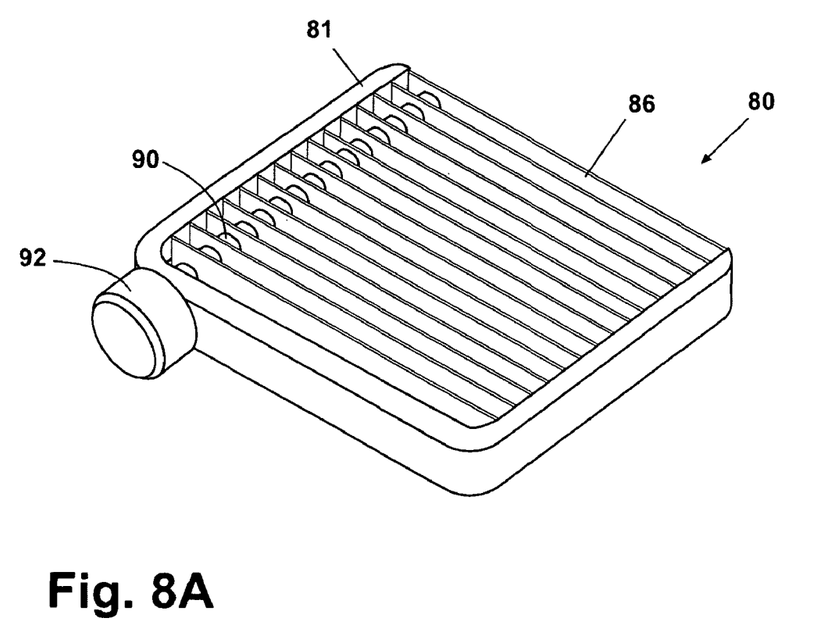
FIG. 8A is a perspective view of a first cutting cassette according to one embodiment of the invention.

Referring to FIG. 8A, the third exemplary food processing tool is a cutting cassette 80, which cuts the food to be processed. The cutting cassette 80 consists of a frame 81 circumscribing a plurality of spaced blades 86 or cutting wires, the cutting planes of the blades 86 may be vertical or slightly angled. Unlike the slicing cassette 60 and shredding cassette 70, the cutting cassette 80 is not rotated, and therefore does not include a cassette gear 66 by which to be driven by the motor 14.

Figure 8B:
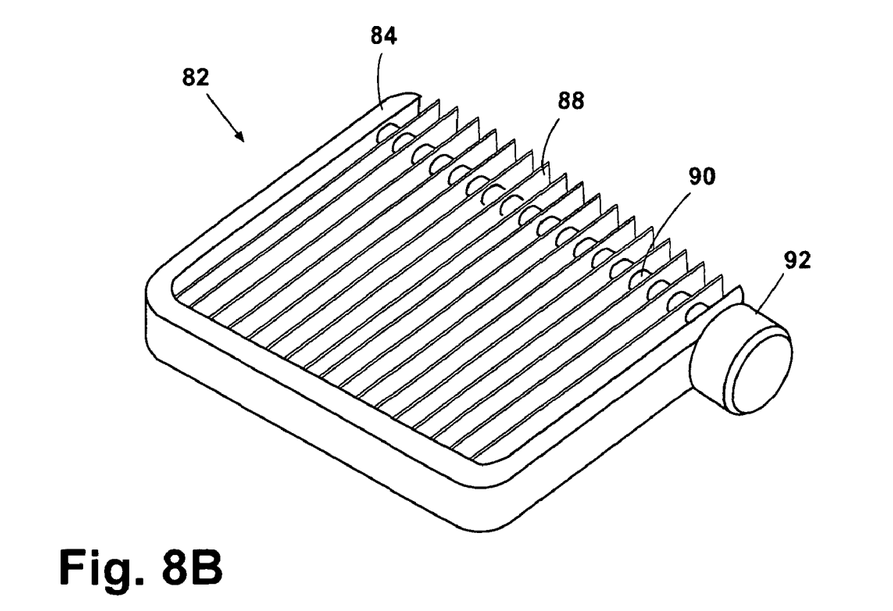
FIG. 8B is a perspective view of a second cutting cassette according to one embodiment of the invention.

Like the cutting cassette 80, the fourth food processing tool, shown in FIG. 8B, is a second cutting cassette 82, which also cuts the food to be processed. The second cutting cassette 82 consists of a frame 84 circumscribing a plurality of spaced blades 88, the cutting planes of which may be vertical or slightly angled. The difference between the cutting cassette 80 and the second cutting cassette 82 is that the second set of blades 88 is orthogonal to the first set of blades 86. The second cutting cassette 82 is not rotated either, and therefore does not include a cassette gear 66.

The cutting cassette 80 and second cutting cassette 82 can be used separately or together. If each is inserted into the provided slots 50 and used together, when viewed from a top-view, the two sets of blades 86, 88 describe a grid. Utilizing this cutting grid, the user may form "sticks" of the food to be processed, for example, carrot sticks.

In another embodiment of the invention, the thickness of the cut of food may be varied, or when using the cutting cassettes 80, 82 together to form sticks, the size of the stick may be varied. One way in which this may be accomplished is by providing the cutting cassettes 80, 82 with an adjustment screw 90. The blades 86, 88 may be slidingly retained by the frame 81, 84, and through a hole (not shown) in each blade, may be meshed with the adjustment screw 90. The adjustment screw 90 may be provided with a knob 92 by which the user can turn the adjustment screw 90. Turning the adjustment screw 90 may increase or decrease the spacing between the individual blades 86 or 88. For example, when the adjustment screw 90 is turned to spread the blades 86 or 88 apart, the spacing between the individual blades may increase, an the excess cutting blades 86 or 88 may be stacked at one end of the adjustment screw 90, out of the food processing path 37. The opposite action may be taken to adjust the blades 86 or 88 back to their original position.

Further, the first and second cutting cassettes 80, 82 may be designed to mesh together when stacked. The meshed cassettes 80, 82 would enable the user to adjust the pair together, synchronizing the movement between the orthogonal cutting blades 86, 88 to maintain a square cutting grid.

Together, the cutting cassette 80 and second cutting cassette 82 may be used in combination with the slicing cassette 60 described above to form cubes of food. As described above, the cutting cassette 80 and second cutting cassette 82 together form a cutting grid. If the user desires to make cubed food, the cassettes 80 and 82 may be inserted into the topmost two slots 50 and the slicing cassette 60 may be inserted into the lower slot 50. Food sticks are formed after the food passes through the first two cassettes 80, 82, then the slicing blade 64 of the slicing cassette 60 cuts the stick at a desired length, or specifically, into cubes. The length of the stick may be set by adjusting the vertical position of the slicing disc 63 as described above. Cubes may be cut by setting equal spacing between the blades 86, 88 of the cutting cassettes 80, 82 and the slicing blade 64 of the slicing cassette 60. An example of a food the user may make using the combination of the cutting cassette 80, second cutting cassette 82, and slicing cassette 60 includes cheese cubes.

The speed of rotation, or processing, for each of the food processing tools 58 can be independently set. One way in which this may be accomplished is through the design of the gear ratios of each food processing tool 58. The cassette gear 66 on each of the food processing tools 58 can be provided with more or fewer teeth, in relation to the drive shaft 24, as is conventional. This enables the food processor 10 to utilize one drive shaft 24, yet output different rotation speeds for each of the installed food processing tools 58. The speed of the drive shaft 24, and therefore the food processing tools 58, may also be varied by adjusting the speed of the motor 14.

Utilizing the multiple slots 50 and food processing tools 58, the user is able to make various combinations, resulting in different sizes and shapes of processed foods. Different processed foods can be formed by inserting the food processing tools 58 into different slots 50, using differing combinations of food processing tools 58, and/or adjusting the spacing of the cutting blades of each of the food processing tools 58.

The device of the present invention offers many benefits to consumers, including the ability to automatically process food cubes. The food processor 10 eliminates the need for the user to cut cubes of food by hand and provides improved variability in the functionality as compared to a standard food processor. This food processor 10 also reduces the number of food processing tools required to slice, shred, or cut food by providing adjustable cassettes, enabling various processed food size. Conventionally, to change the size of the processed food, multiple food processing tools are needed for each function.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A food processor comprising:
   a housing defining a food processing path;
   multiple slots formed in the housing and extending into the food processing path; and
   multiple food processing tools, which may be selectively removably received within the multiple slots such that when the multiple food processing tools are simultaneously installed within the multiple slots, food passing along the food processing path is processed sequentially by each of the multiple food processing tools as the food progresses down the food processing path according to each of the food processing tools received within the slots.

2. The food processor according to claim 1 wherein at least some of the multiple food processing tools perform a different food processing function.

3. The food processor according to claim 1 wherein the multiple food processing tools comprise at least two of a shredding tool, a slicing tool, and a cutting tool.

4. The food processor according to claim 1 wherein the multiple food processing tools comprise at least two cutting tools.

5. The food processor according to claim 4 wherein each of the at least two cutting tools have cutting elements and the cutting elements of each tool are arranged along different planes.

6. The food processor according to claim 5 wherein the planes are orthogonal to each other to collectively form a cubing tool.

7. The food processor according to claim 1 further comprising a cassette sized to be slidably received within the slot and in which the food processing tool is mounted.

8. The food processor according to claim 7 wherein the food processing tool comprises first and second discs, which are relatively movable to each other, with one of the discs having a cutting element, wherein the relative movement of the discs adjusts a bite of the cutting element.

9. The food processor according to claim 8 wherein the discs are rotatably mounted within the cassette.

10. The food processor according to claim 1 further comprising a food pusher receivable in the food path and a drive system operably coupled to at least one of the food pusher to drive the food pusher along the path to force food along the path and the processing tool to drive the processing tool.

11. A food processing system comprising:
a food processor comprising:
a housing defining a food processing path;
a food processing slot formed in the housing and extending into the food processing path;
a food pusher moveable within the food path to push food along the path; and
a drive system; and
a plurality of food processing cassettes sized for receipt within the food processing slot, with each cassette having a food processing tool applying a food processing function such that food passing along the food processing path is processed by the tool;
wherein the drive system is operably coupled to at least one of the plurality of cassettes to drive the corresponding food processing tool when the one of the plurality of food processing cassettes is received within the slot and wherein the food processing tool of at least some of the plurality of food processing cassettes is rotatably mounted within the corresponding food processing cassette and the drive system rotates the rotatably mounted food processing tool.

12. The food processing system according to claim 11 wherein the plurality of food processing cassettes comprise at least two of: a shredding cassette, a slicing cassette, and a cutting cassette.

13. The food processing system according to claim 11 wherein the plurality of food processing cassettes comprise at least two cutting cassettes.

14. The food processing system according to claim 13 wherein each of the at least two cutting cassettes have cutting elements and the cutting elements of each tool are arranged along different planes.

15. The food processing system according to claim 14 wherein the planes are orthogonal to each other to collectively form a cubing tool.

16. The food processing system according to claim 11 wherein the slot comprises multiple discrete slots, with each of the multiple discrete slots receiving a cassette.

17. The food processing system according to claim 11 wherein the drive system is operably coupled to the food pusher to drive the food pusher along the path to force food along the path.

* * * * *

UNITED STATES PATENT AND TRADEMARK OFFICE
CERTIFICATE OF CORRECTION

| | | |
|---|---|---|
| PATENT NO. | : 8,215,231 B2 | Page 1 of 1 |
| APPLICATION NO. | : 12/477976 | |
| DATED | : July 10, 2012 | |
| INVENTOR(S) | : William J. Bigge et al. | |

It is certified that error appears in the above-identified patent and that said Letters Patent is hereby corrected as shown below:

Col. 6, lines 45 - 47, Claim 3: "The food processor according to claim 1 wherein the multiple food processing tools comprise at least two of a shredding tool, a slicing tool, and a cutting tool." - should be Claim 3: --The food processor according to claim 1 wherein the multiple food processing tools comprise at least two of: a shredding tool, a slicing tool, and a cutting tool.--

Signed and Sealed this
Twenty-ninth Day of January, 2013

David J. Kappos
*Director of the United States Patent and Trademark Office*